(12) United States Patent
Scarborough

(10) Patent No.: US 10,814,933 B2
(45) Date of Patent: Oct. 27, 2020

(54) LEVER ENHANCED PEDALING SYSTEM WITH ELEVATED CRANK SPROCKETS

(71) Applicant: Rashad Na'im Scarborough, Durham, NC (US)

(72) Inventor: Rashad Na'im Scarborough, Durham, NC (US)

( * ) Notice: Subject to any disclaimer, the term of this patent is extended or adjusted under 35 U.S.C. 154(b) by 75 days.

(21) Appl. No.: 15/782,992

(22) Filed: Oct. 13, 2017

(65) Prior Publication Data

US 2018/0127052 A1    May 10, 2018

Related U.S. Application Data

(60) Provisional application No. 62/496,608, filed on Oct. 24, 2016.

(51) Int. Cl.
*B62M 1/28* (2013.01)
*B62M 1/26* (2013.01)
*B62M 1/30* (2013.01)

(52) U.S. Cl.
CPC ............... *B62M 1/28* (2013.01); *B62M 1/26* (2013.01); *B62M 1/30* (2013.01)

(58) Field of Classification Search
CPC . B62M 1/28; B62M 1/30; B62M 1/24; B62M 3/06
See application file for complete search history.

(56) References Cited

U.S. PATENT DOCUMENTS

| | | | | |
|---|---|---|---|---|
| 608,674 | A * | 8/1898 | Harshner | B62M 11/00 280/257 |
| 766,010 | A * | 7/1904 | Zelenka | |
| 849,342 | A * | 4/1907 | Swibbank | F16H 31/001 74/136 |
| 3,661,404 | A * | 5/1972 | Bossaer | |
| 3,759,543 | A * | 9/1973 | Clark | |

(Continued)

OTHER PUBLICATIONS

Stepwing T3 by Brizon URL address: http://www.brizon.com.tw/product/stepwing-t3/.

*Primary Examiner* — Michael McCullough

(57) ABSTRACT

A lever propelled bicycle providing elements allowing it to have significant performance, friction reduction, standard bicycle weight and a wide range of downward pedal to rear wheel turn ratio due to the following mechanical configurations: These include, a drive axle and reciprocal axle elevated near each other to keep the frame upon which these components rest on, narrower in side width or surface area; the fulcrum of the propulsion levers in front of the rear wheel axle and pedals in conventional ergonomic positions to provide a force multiplying machine with above average torque; and a reciprocal means utilizing two pulley wheels to carry an adaptable linear apparatus over their upper and outfacing surfaces for the purpose of transferring the downward pull of the linear apparatus by the right lever machine to lift the left lever up in a vertical 90 degree pivotal motion and vice versa, resulting in a smooth transfer of reciprocal power with reduced friction and weight. Furthermore, the pull of each lever machine in a vertical vector of force eliminates inward angular pulling pressure on each lever machine, which prevents each lever machine from being bent out of vertical alignment during pedaling.

3 Claims, 8 Drawing Sheets

(56) References Cited

U.S. PATENT DOCUMENTS

| | | | | |
|---|---|---|---|---|
| 3,834,733 A * | 9/1974 | Harris | B62M 1/28 | 280/251 |
| 3,889,974 A * | 6/1975 | Kallander | B62M 1/28 | 280/251 |
| 3,913,945 A * | 10/1975 | Clark | B62M 1/12 | 280/233 |
| 4,019,230 A * | 4/1977 | Pollard | | |
| 4,227,712 A * | 10/1980 | Dick | B62M 1/28 | 280/236 |
| 4,300,784 A * | 11/1981 | Efros | B62M 1/28 | 280/236 |
| 4,445,701 A * | 5/1984 | Stroud | B62M 1/10 | 280/217 |
| 4,561,318 A * | 12/1985 | Schirrmacher | B62M 1/26 | 280/253 |
| 4,561,668 A * | 12/1985 | Klopfenstein | B62M 1/26 | 280/226.1 |
| 4,574,649 A * | 3/1986 | Seol | B62M 1/28 | 192/28 |
| 4,666,173 A * | 5/1987 | Graham | B62M 1/26 | 280/255 |
| 4,666,174 A * | 5/1987 | Efros | B62M 1/28 | 188/24.12 |
| 5,335,927 A * | 8/1994 | Islas | B62M 1/28 | 280/254 |
| 7,011,376 B2 * | 3/2006 | Sepulveda | B62M 1/28 | 280/252 |
| 7,510,201 B2 * | 3/2009 | Scarborough | B62K 3/06 | 280/253 |
| 7,823,899 B2 * | 11/2010 | McIsaac | B62M 1/24 | 280/255 |
| 8,465,038 B2 * | 6/2013 | Scarborough | B62M 1/28 | 280/253 |
| 8,632,089 B1 * | 1/2014 | Bezerra et al. | | |
| 8,979,107 B2 * | 3/2015 | Lin | B62M 1/28 | 280/252 |
| 9,902,461 B2 * | 2/2018 | Bezerra | B62M 1/14 | |
| 10,300,987 B2 * | 5/2019 | Staehlin | B62M 13/02 | |
| 2006/0181050 A1 * | 8/2006 | Moreno | B62K 3/002 | 280/221 |
| 2008/0054589 A1 * | 3/2008 | Scarborough | B62K 3/10 | 280/254 |
| 2008/0096708 A1 * | 4/2008 | Meguerditchian | B62K 3/002 | 474/148 |
| 2008/0106061 A1 * | 5/2008 | Meguerditchian | B62K 3/002 | 280/253 |
| 2008/0271551 A1 * | 11/2008 | Meguerditchian | B62M 1/24 | 74/37 |
| 2019/0210689 A1 * | 7/2019 | Hong | B62M 1/26 | |

* cited by examiner

LEVER ENHANCED PEDALING SYSTEM WITH ELEVATED CRANK SPROCKETS

CROSS-REFERENCE TO RELATED APPLICATIONS

This application claims the benefit of provisional patent application Ser. No. 62/496,608, filed 2016 Oct. 24 by the present inventor.

BACKGROUND

Prior Art

The following is a tabulation of some prior art that presently appears relevant:

| U.S. Pat. No./ Pub. Number | Kind Code | Issue Date | Patentee |
| --- | --- | --- | --- |
| 4,666,173 | B62M | 1987 May 19 | Graham |
| 8,632,089 | B1 | 2014 Jan. 21 | Bezerra |
| 5,280,936 | | 1994 Jan. 25 | Schmidlin |
| 2003/0193159 | A1 | 2003 Oct. 16 | Ridenhour |
| 2008/0106061 | A1 | 2008 May 8 | Meguerditchian |
| 8,979,108 | B2 | 2015 Mar. 17 | Koscielecka |
| 2010/0320718 | A1 | 2010 Dec. 23 | Buchberger |
| 7,048,290 | B2 | 2006 May 23 | Paquette |
| 3,498,634 | | 1970 Mar. 3 | R. E. Sheldon |
| 7,510,201 | B2 | 2009 Mar. 31 | Scarborough |
| 7,896,377 | B2 | 2011 Mar. 1 | Scarborough |
| 8,465,038 | B2 | 2013 Jun. 18 | Scarborough |

This invention relates to lever propelled bicycles that utilizes long lever machines in order to achieve mechanical advantage during pedaling. Prior art on the frame design can be seen on the YouTube™ trailer, "The amazing stunts of bullcity-Mechanized Poetry." The frame design is similar, but the propulsion configuration uses a first class lever machine, with direct pull on the Lever Enhanced Pedaling System's wrap around technology (U.S. Pat. No. 8,465,038 B2). This system works, but it is limited in performance. It has no room for further configuration of gear ratios, or for an internal gear hub coupled to the rear wheel. So there was a need to come up with a lever powered bicycle that could that could take advantage of low pedaling resistance, while allowing a wider range of wheel revolutions per pedal. So a more indirect gear mechanism was invented to allow this. Instead of there being a first class lever machine, having direct pull on a radial drive member, such as the wrap around system on the P-classic design, as illustrated on YouTube™, an indirect system was needed to improve the performance of the bicycle so as to allow the bicycle to have 1 to 0.50 input to output pedaling range when climbing hills and 1 to 1.8 pedaling range when on flat terrain to increase speed. Thus, it was necessary to connect a bicycle chain to the middle of a lever machine, with a proximity closer to the fulcrum than the pedal, and with a 12 tooth sprocket just above this connection to give the chain pull the most range per pedal without a lot of swing on the chain. Then duplicate this mechanical configuration on the left side of the bicycle while allowing these 12 tooth sprockets to have slip lock forward ability on the same axle and providing this axle with a fixed sprocket with 20 teeth positioned between these two sprockets in order to provide more circumference of movement with the movement of the 12 tooth sprockets. This 20 tooth sprocket would be on the right side of the rear wheel while the axle it was rotating on was elevated above most of the rear wheel. A chain around this 20 tooth sprocket would also be around a 16 tooth sprocket coupled to an internal gear hub of the rear wheel. This type of mechanical configuration would allow more range per pedal on a 1 to 1 gear ratio means, while at the same time allowing for more torque by decreasing output and more speed by increasing output per pedal.

U.S. Pat. No. 4,666,173 to Graham has a similar mechanical configuration to the present invention, but this design is an add on to a conventional frame structure and thus would add more weight to the bicycle, because the frame was not design to counter the weight gain of the parts added to the bicycle intended to exploit the mechanical advantages of the lever machine. This issue also is seen in Bezerra's patent U.S. Pat. No. 8,632,089 B1. The same mechanical advantage could be accomplished by moving the elevated crank sprocket closer to the seat post, thus reducing the material needed to mount the three sprocket assembly. The central sprocket between the two adjacent sprockets could have been mounted directly to the rear frame of the bicycle and the lever machine designed to pull them, could have been between the axles of the rear and front wheel. What really sets the LEPS with elevated crank sprockets apart from both Bezerra's and Graham's invention is that the metal housing used to pivot the reciprocal pulley wheels forwards and backwards are used to stop each lever machine from moving upwards, which is the bicycles pedaling peak. This upward collision of the compression spring attached to the lever of the LEPS with elevated crank sprockets also stops the adjacent lever machine from moving further downward and hitting the ground. So in a way, the metal housing for the pulley wheel serves multiple purposes, which significantly helps reduce the weight of the bicycle. Firstly, it swings with the movement of the steel cable attached to the mid portion of each lever machine and its stops the front end of each lever machine from hitting the ground, while the rider is pedaling. These weight reduction design elements significantly improves acceleration performance when using the bicycle. The patent issued to Graham uses two different components to reciprocate and stop downward pedal movement. These materials can weigh down the bicycle making everyday handling and use of the bicycle burdensome.

Furthermore, the LEPS with elevated crank sprockets have reciprocal steel cables that pull their connected lever machine up in a 90 degree vertical direction instead of in an angular direction like the roller chain on the singular sprocket (74 FIG. 3) Graham uses in his patent or the steel cable on the pulley wheel (32 FIGS. 1 & 2) Bezerra uses in his patent and thus this mechanical configuration will present a problem to the longevity of the lever machines using this type of reciprocal assembly.

Firstly, the LEPS's with elevate crank sprockets has a reciprocal system and propulsion system with 90 degree vertical pull on each lever machines used to propelled them. Thus, it does not pull at an angle and therefore these lever machines won't get bent out of parallel alignment while pedaling. Such 90 degree pull on each lever machine keeps them in parallel alignment with the upward pull of the steel cable as well as the roller chain that connects each symmetrical freewheel sprocket to their member lever machine and as a result, friction on the bearings accommodating the axle of each fulcrum is not unevenly distributed. These convenient features are absent in the patent granted to Bezerra U.S. Pat. No. 8,632,089 B 1. Because his invention has two clutch radial members (22 & 23) below the seat, which engages a chain (24 & 26) connected to their member lever machines, with the load being connected to the lower rear portion of the lever machine, while these radial clutch members (22 & 23) are between the lever machines, there is no possible way to centralize the load of the propulsion chain on center of each lever machine. This means that the pull of each roller chain, from the lower rear portion (15 or 17) of each lever machine to the lower tangent curve of each radial clutch member (22 or 23) will pull at an inward angle potentially pulling each lever machine out of parallel alignment over time. That is a performance issue that has been proven in research when reducing patented lever powered bicycles to practice ("The Amazing Stunts of Bull City" Youtube™.com) It would be more advantageous to position the freewheel sprocket teeth 90 degrees above its member lever machine, on center of its member lever machine, while the pull of the roller chain from its member lever machine fastened with pivotal ability on center to connected lever machine, pulls on the engaged sprocket teeth that is 90 degrees above it. Thus, the force of the chain is concentrated through the center of the lever machine, while not influencing the lever machine to move to the left or right due to angular pull influencing.

U.S. Pat. No. 3,039,790 to D.E. TROTT shows a lever propelled bicycle with a chain that directly connects the lever machine and rear wheel sprocket. This mechanism is different to the Lever Enhanced Pedaling System (L.E.P.S.) Elevated Crank Sprockets, in that it needs two sprockets on the right and left side of the rear wheel, while only one sprocket is needed on the right side of the rear wheel of the L.E.P.S. The industry standard reduces the need for specialized sprocket assemblies, which would also reduce manufacturing cost if conventional sprocket assemblies were used instead of right/left rear wheel forward slip lock mechanism that are used to be specially built to accommodate this propulsion set up.

Variable SPEED LEVER ACTION BICYCLE DRIVE having U.S. Pat. No. 3,759,543 to M. Clark Published on Sep. 18, 1973 has sprockets on opposite sides of the rear wheel. Two slip lock sprockets on a rear wheel generates more friction while the bicycle is coasting, making the rider of this type of bicycle work more than a rider with one slip lock sprocket coupled to the rear wheel.

The lever powered bicycle invented by Anna Koscielecka, Boguslaw Koscielecka and Marika Koscielecka patent # DE2012/000005 on Jan. 30, 2012 does not take advantage of bringing the load closer to the fulcrum in order to create mechanical advantage. Only the person's weight would determine mechanical advantage. Ergonomically, not rider friendly, because the pedals don't pivot in a motion that is agreeable with how a human bends his or her legs. Human legs bend back towards the rear wheel and not forward as illustrated in FIG. 1 of this patent application. The L.E.P.S. uses a steel cable above the fulcrum to reciprocate the levers, thus clearing the way for ground objects so the pedals won't collide with them. The Koscielecka design has a reciprocal system close to the ground limiting this bicycle to non hilly terrain.

SUMMARY

What sets the L.E.P.S. with elevated crank sprockets apart from prior art is its reciprocal system for pivoting member lever machines, which is an improvement to a propulsion system utilizing free wheel sprocket(s), roller chains and crank sprocket(s) assemblies. This particular design has mechanical properties that prior art does not have. These properties include a metal housing 34 with the ability to pivot separate pulley wheels back and forth; a stopping means that prevent a lever machine from pivoting up, therefore preventing its adjacent lever machine from hitting the ground; a shock absorbent means which absorbs the impact of the lever machine against the aluminum housing 34; and a positioning of the each pivotal pulley wheels that allows the steel cable that rolls over it, to interact with member lever machines at a 90 angle, which prevent each lever machine from being pulled right or left and as a result would keep each lever machine frictionless and in parallel alignment. The reciprocal system mentioned offers four main elemental benefits:

1. It reduces friction
2. It reduces weight
3. It keeps right and left lever machines in parallel alignment.
4. It serves as a stopping means for each lever machine.

An improved lever propelled bicycle that provides the rider with the means of low pedaling resistance due to no rotation of the pedal, thus voiding out the fluctuation in force needed to pedal the bicycle forward. A pedal on a conventional bicycle changes its position in proximity to the fulcrum of the crank sprocket as it rotates. The lever enhance pedaling systems with elevated crank sprockets maintains a linear curve, thus reducing the fluctuation in effort needed to propel the bicycle. The vertical spring around the reciprocal cable on the opposite side of the pressed pedal contracts, while absorbing the shock of the downward pedal when it is pressed to its lowest pivotal point, then gives energy back to the leg, while causing it to bounce up to reposition or raise the foot upward for future downward pedaling. This repetition of downward pedaling and energy return would happen on both pedals as each pedal reciprocate in opposite directions up and down. The propulsion chain is positioned midway on the lever machine between the fulcrum and pedal. However, this chain position is located closer to the fulcrum giving the rider more mechanized leverage. So if the rider pedals the bicycle when it is a single speed or the internal gear hub ratio is 1 to 1, the rider's downward weight on the pedal should give an output of over twice the rider's weight. Furthermore, an internal multispeed hub within the rear wheel would allow the rider to increase his or her speed simply by changing the gear ratio at the right handle bar grip.

Additionally, the bicycle is lighter than its predecessor because much of the frame's tubular diameter has been reduced, which includes the middle tube and rear tube. The middle tube diameter had been reduced from 2.50" to 2". The rear symmetrical tubes diameter has been reduced from 1.25" to 1.00". The lever machines have significantly less aluminum plate forms surrounding the bore, which complements the fulcrum of the lever machines. Instead of four pulley wheels for the reciprocal system, this bicycle now has two. The advantage of this bicycle is that it has its right and left freewheel sprockets directly below the seat of the bicycle, instead of on opposite sides of the rear wheel hub. This means it can accommodate a more efficient multi-speed hub like the Nuvinci® n360 internal speed hub for a wide range of multi-speed gear ratios. Furthermore, it can accommodate more traditional multispeed freewheel flywheel cassette sprockets with a derailleur system. Derailleur systems cost less than internal multispeed hubs and can allow the cost of the bicycle to do down significantly.

The freewheel sprockets fixed at opposite ends of the rational axle that is between the outer surface of the rear wheel and seat can be configured to be small, while the fixed middle sprocket that rotates in one direction between the freestyle sprockets can be configured to be larger in pitch diameter in order to move the drive chain connected to the rear wheel a longer distance. This middle sprocket would have a conventional chain connecting it to the freestyle sprocket coupled to the rear wheel of the bicycle. This freestyle sprocket would be smaller in pitch diameter than the central sprocket as the freestyle sprockets located between the seat and rear wheel. Carbon fiber belts could be used with the central sprocket and rear wheel sprocket to reduce the weight of the bicycle.

In conclusion the beneficial elements of the Lever Enhanced Pedaling System with Elevated Crank Sprockets are that:

The load is closer to the fulcrum than to the pedal or area of applied force, which allows the peddler's efforts to be doubled or output per downward pedal to be doubled.

The drive sprockets are positioned right above the load, which eliminate the bicycle chains excessive swinging as it is pulled downward and this mechanical configuration provides the most range per pedal. Thus, the more the swing is, the less the range per pedal.

The pivotal path of the pedals move in a downward linear curve, which is not far from the downward pull of the vector of gravity on objects 90 degrees from the earth surface. Thus, a person can use the weight of body parts or body weight to propel themselves forward. This is the meaning of low pedaling resistance.

Two adjacent sprockets indirectly connected to their member lever machine and a central sprocket allows for a variety of gear ratios in order to achieve the desired range per pedal.

This mechanical configuration offers low pedaling resistance. This means there is no rotation motion needed to pedal this bicycle. Just downward linear movements. This means that when the pedal is at its peak position in reciprocal pedaling, it does not have to be moved forward for driving propulsion like conventional bicycles. On a conventional bike, the pedals rotate over its fulcrum requiring the rider to provide more effort to press the pedal. Downward pedaling would be resisted by the lever or crank arm being 90 degrees above the fulcrum or axle of the crank sprocket. For example, if you applied direct 90 degree force of a conventional pedal, you could not move the pedal. You would have to move the pedal at an 180 degree angle then apply downward pedaling force. The further the pedal is horizontally away from the fulcrum, the more easily downward pedaling is, until the pedal is at its peak. This fluctuation of force needed to propel a conventional bicycle is absent in the Lever Enhance Pedaling System with Elevated Crank Sprockets. Since the position of each pedal to its member fulcrum stays almost the same, because it pivots in a more linear downward path, fluctuation in force is rarely noticed.

DRAWINGS

FIG. 1 is a right side orthographic view of the bicycle's vital operational components, which includes the lever machines 12, propulsion chains 16 and their connection to the lever machines 12 and drive sprockets (22 and 24).

FIG. 2 is a rear orthographic view of the bicycle. It illustrates the bicycles central sprocket 24 on the right side of the rear wheel 50 and its connection to the sprocket 28 and hub 66 of the rear wheel 50 through a drive chain means. It also illustrates the general frame configuration.

FIG. 3 illustrates a top orthographic view of the bicycle, which exposes the central sprocket 24 between the frame 10 and rear wheel 50 and how the chain 26 connects this sprocket 24 to the sprocket 28 of the rear wheel. It also illustrates the position of the elevated crank sprocket axle 38 on the frame.

FIG. 4 illustrates a broken sectional view of SECTION CC exposing the size of the symmetrical freestyle sprocket 22 relative to the larger central fixed sprocket 24. It also exposes the compression springs 18, reciprocal cables 14, reciprocal plates 34 and how the drive chain 16, steel cable 14, and compression spring 18 is assembled inside the vertical pivotal tube 62. This illustration depicts how the lever machines propel and engages the drive sprockets of the L.E.P.S. for forward propulsion and how the pulley wheels 32 are positioned between the fold of the reciprocal plates 34. It also illustrates the axle 36 of the reciprocal plates 34.

FIG. 5 illustrates a cut away sectional view of SECTION AA revealing the central frame tube 10 and rear symmetrical rear tubes 10. It also shows how the freestyle sprockets 22 are positioned beneath member symmetrical tubes of the frame 10 and how the axle 38 these sprockets rotate on provide forward drive on the central sprocket 24.

FIG. 6 Illustrates a cut away sectional view of SECTION BB revealing a more complete view of the reciprocal plates 34 having pivotal ability on the frame 10. It further shows how the folded plates 34 pivots on the axle 36 and how the pulley wheels 32 are assembled between them. It further shows how the steel cable 14 is positioned on the pulley wheels 32.

DETAILED DESCRIPTION

Figure 1:
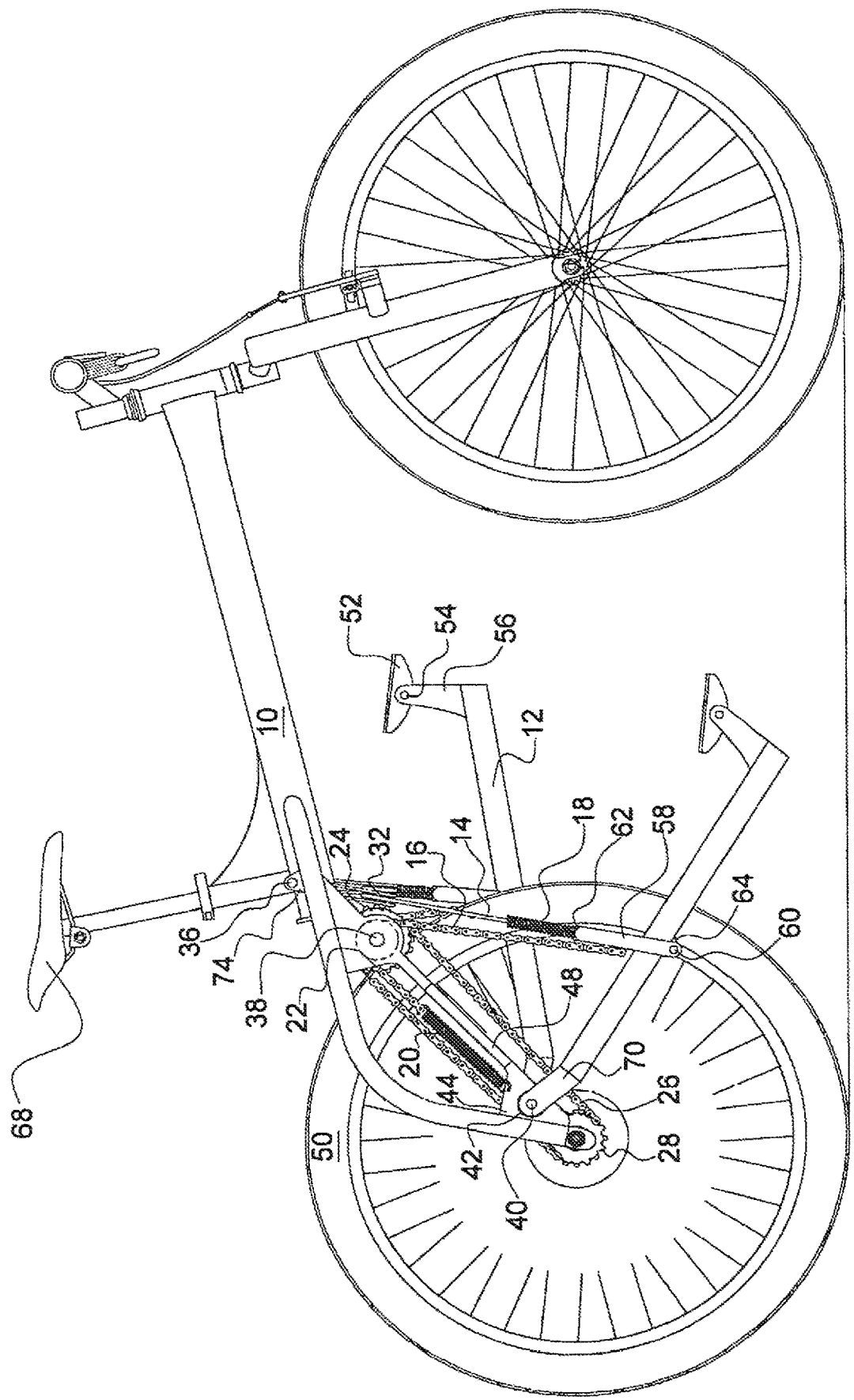

FIG. 1 is an orthographic view, which illustrates the bicycles vital functional components of lever propulsion while pedaling. The pedal 52 is located at the far frontal end of the lever machine 12. This pedal has pivotal ability at the peak of the pedal mount 56 at its shaft 54. The lever 12 is composed of an aluminum tube that is reinforced by an aluminum metal that is a linear rectangular plate positioned vertically to support the rider above ground without bending. This plate is also reinforced on its middle portion by a welded plate of aluminum about 7" in length to support the area bearing the most pressure, which would be right above the shaft 60 of the chain and steel cable holder. The chain and steel cable holder is composed of two aluminum plates 58 that are parallel with aligned bores on center of its rounded lower end.

Figure 6:
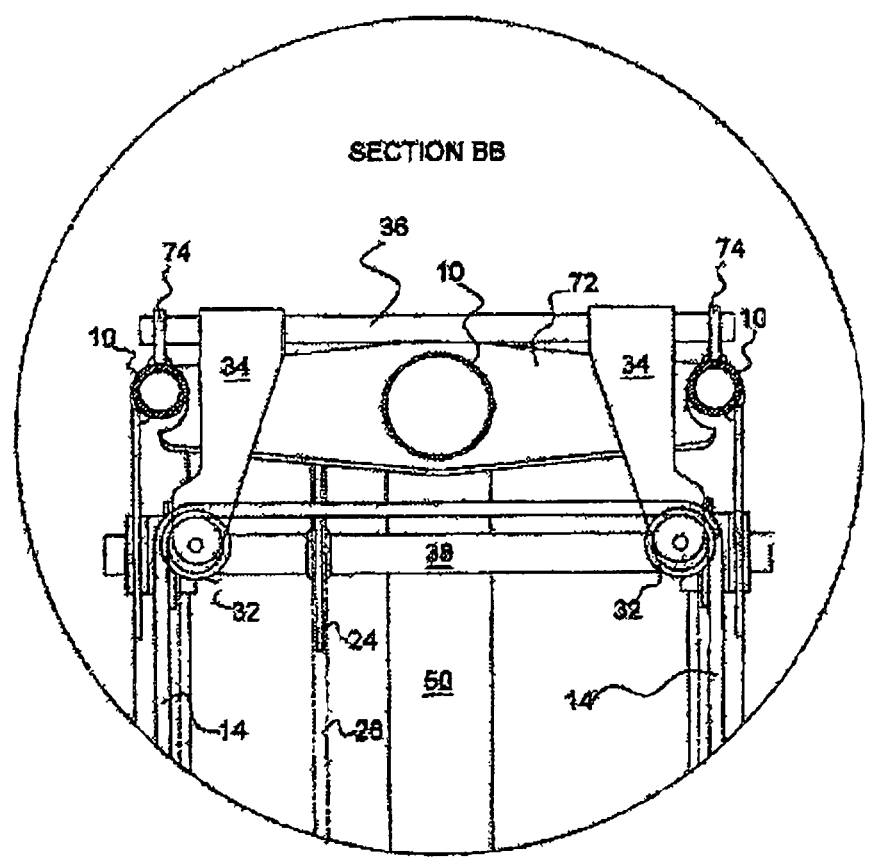
Figure 7:
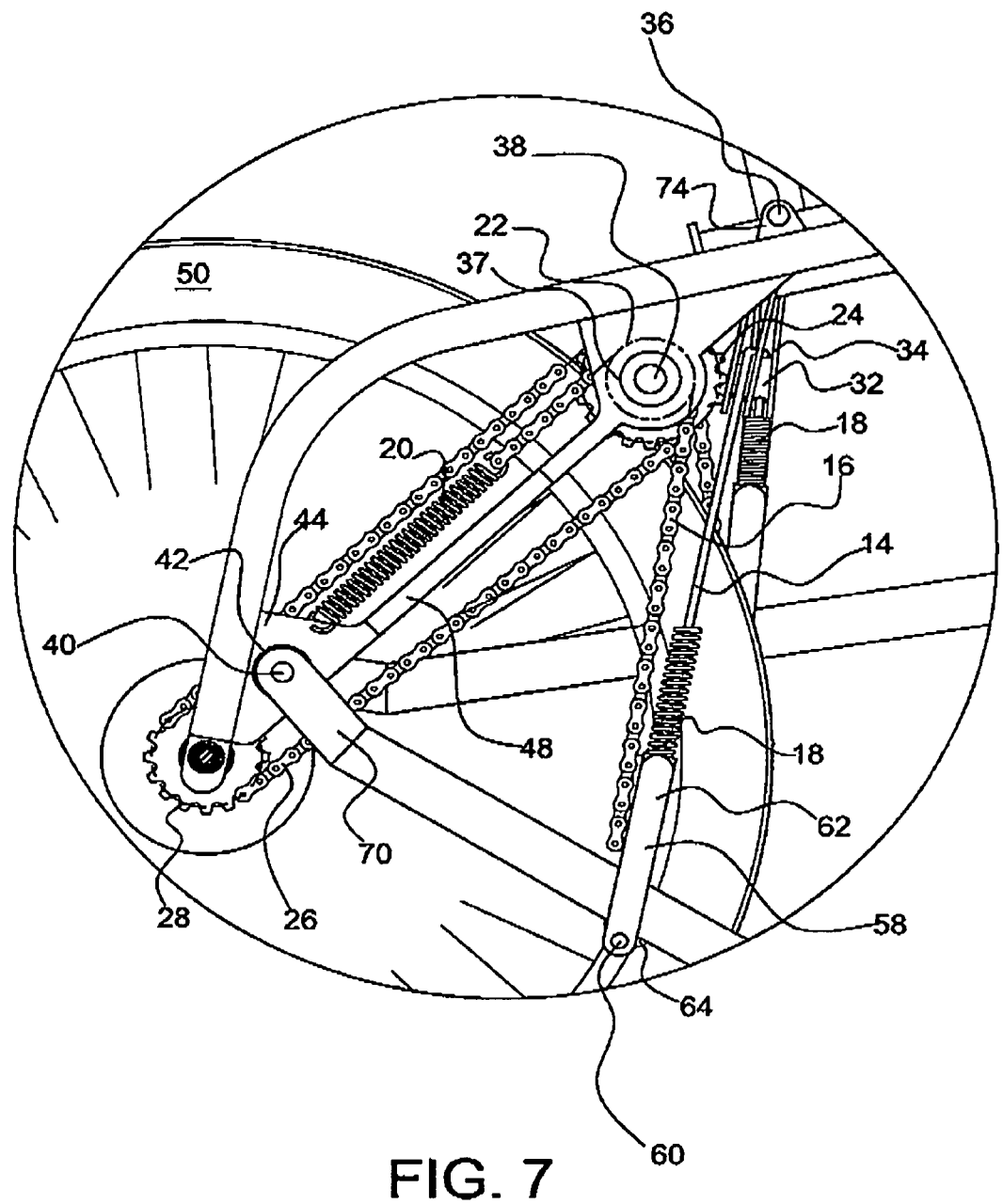
FIG. 7 Illustrates a zoomed in outer view of the bicycles vital components as if you were seeing it with the exception of the hidden pitch diameter line of the of the freestyle drive sprocket 22.
Figure 8:
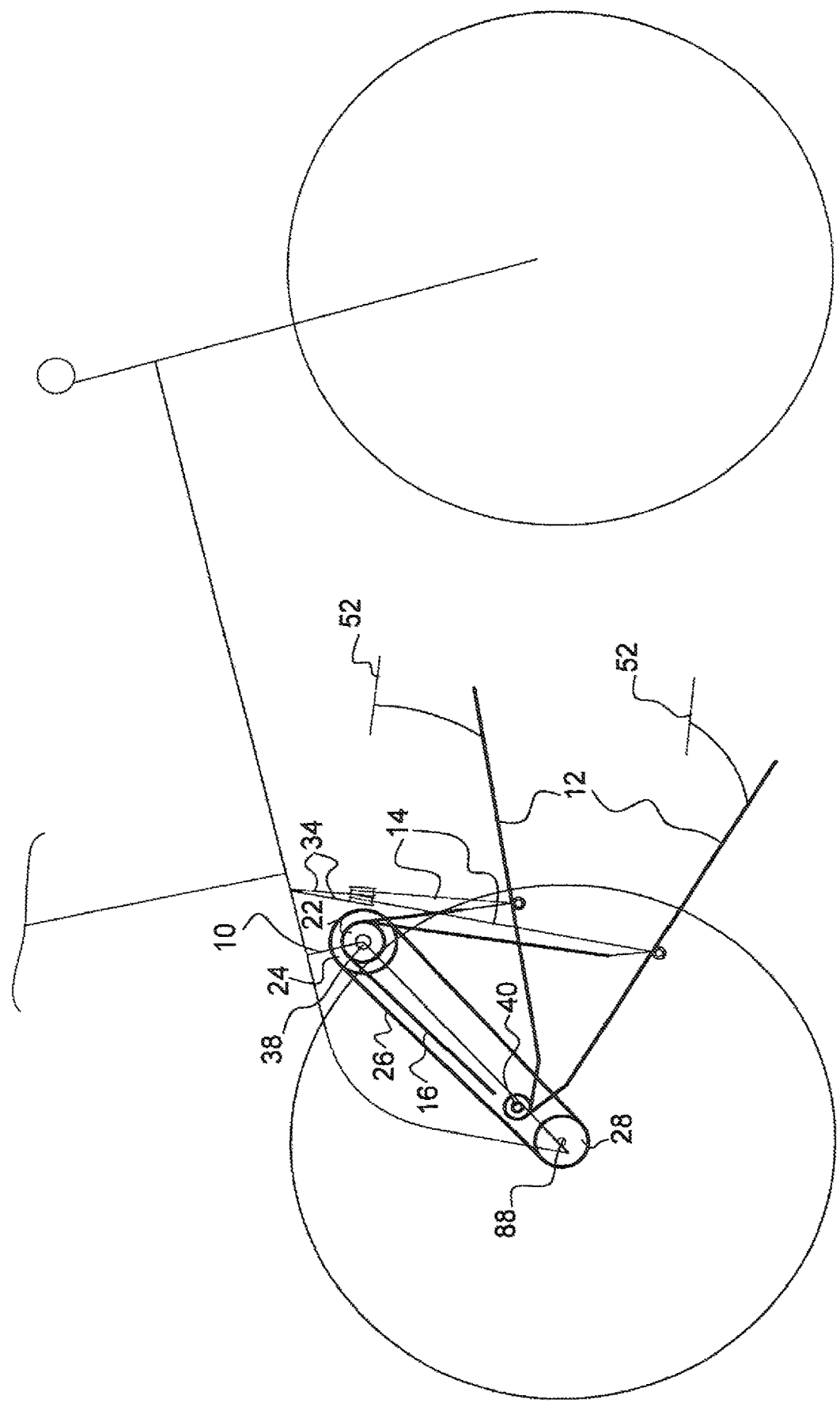
FIG. 8 illustrates a schematic representation of the bicycle's principle drive chains (16 and 26), sprockets (22, 24 and 38) and lever configuration in bold lines.

This end 58 has pivotal connection to the lever 12. A steel bolt 60 occupies these bores. This bolt also occupies an aluminum cylinder that is horizontally beneath the lever tube 12 and welded 64 in place. Between the plates 58 is an aluminum tube 62 about 0.75" in diameter. The tube 62 is welded along its outer surface to the inner edges of said rectangular parallel plates 58. The plates are 0.1875" in thickness. The aluminum the tube accommodates a compression spring 18. This spring 18 is welded in place by a J-B Weld™ resin. The spring 18 is able to contract from the top downwards when its adjacent member is pulled downward in a completed pedaling cycle. Within the coil of the spring 18 is a steel cable 14 also secured by J-B Weld™ within the tube 62 between the plates 58. This ¼ outer diameter steel cable is able to hold over 4000 lbs. of weight. It leads up through the compression spring to within the concaved grooves of its member pulley wheel 32. This cable 14 then leads horizontally to its adjacent pulley wheel 32 (FIG. 6) with the same assembly and then curves down to lead vertically downward into the coils of its member compression spring 18. With duplicate parts and construction as said first welded tube 62 and plates 58 on the right side. Both pulley wheels 32 have rotational ability and are fastened between the inner surfaces of their C-clamp member 34 component. This C-clamp 34 is a bent piece of aluminum plate shaped by a computer aided machine (i.e. laser cutter or water jet cutter). It is bent into a fold so that its upper bend has an inner diameter of 0.625 to accommodate the shaft 36 it pivots on. Right below this shaft 36 is a piece of aluminum plate perpendicularly positioned to the C-clamp that is shaped so that its upper curve accommodates the outer diameter of it member shaft 36. This piece of aluminum plate 84 is welded within the fold of the aluminum C-clamp 34 to keep the assembly from moving upward when the compression spring 18 engages the aluminum housing 34 of the pulley wheel 32. At the mid portion of the vertical aluminum plates 58 is the lower edge of the tube 62 welded between them. This lower end accommodates a roller chain 16 with a J.B. weld resin hardened throughout the tube 62. This chain 16 then leads upward to engage the sprocket teeth, of its member sprocket 22 having forward drive slip lock ability. This engagement allows the surfaces of the chain 16 to stay in contact with and pull forward over of the sprockets teeth without slipping. The chain 16 then curves downward towards the axle 82 of the rear wheel. A contraction spring 20 is hooked at the end of this bicycle chain 16. The other end of this spring 20 is hooked onto the frame 44 of the bicycle. It has the ability to maintain constant pull on the bicycle chain 16 which keeps the chain tautly engaged to its member sprocket 22.

Figure 2:
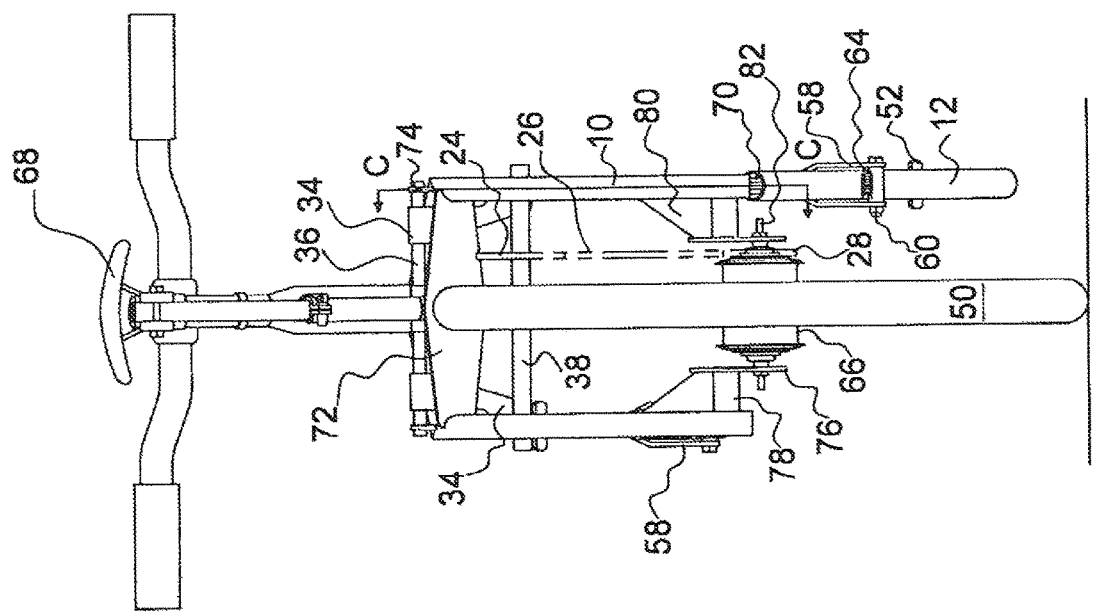
Figure 3:
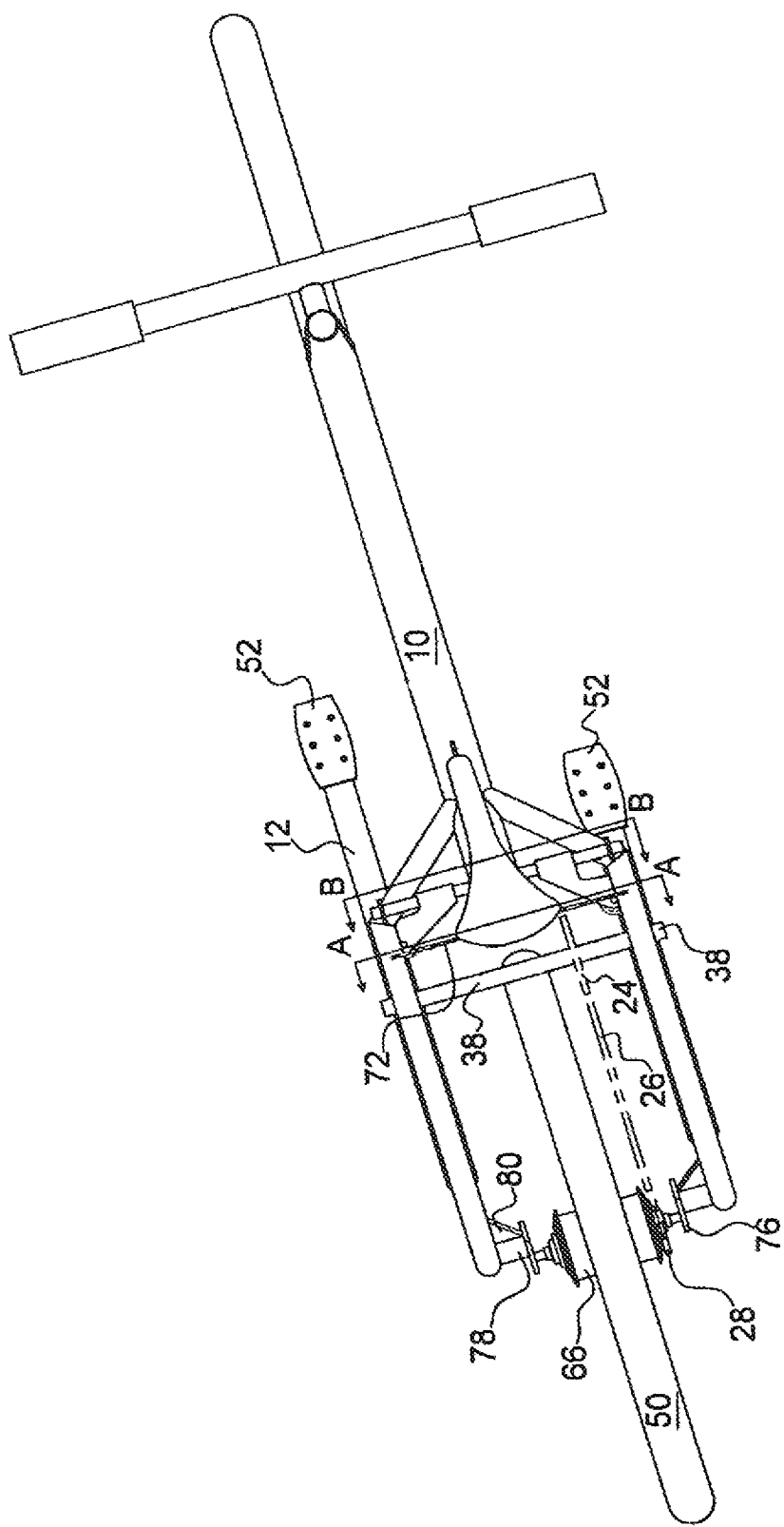
Figure 4:
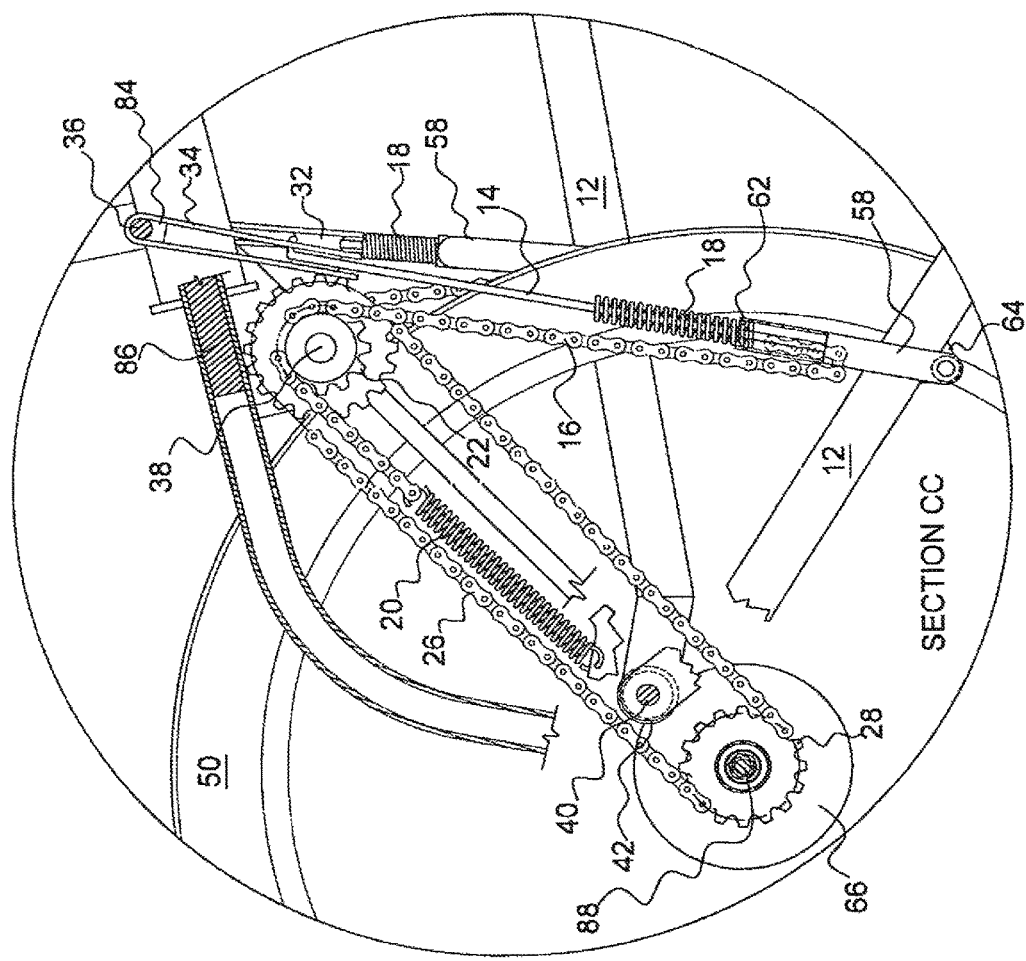
Figure 5:
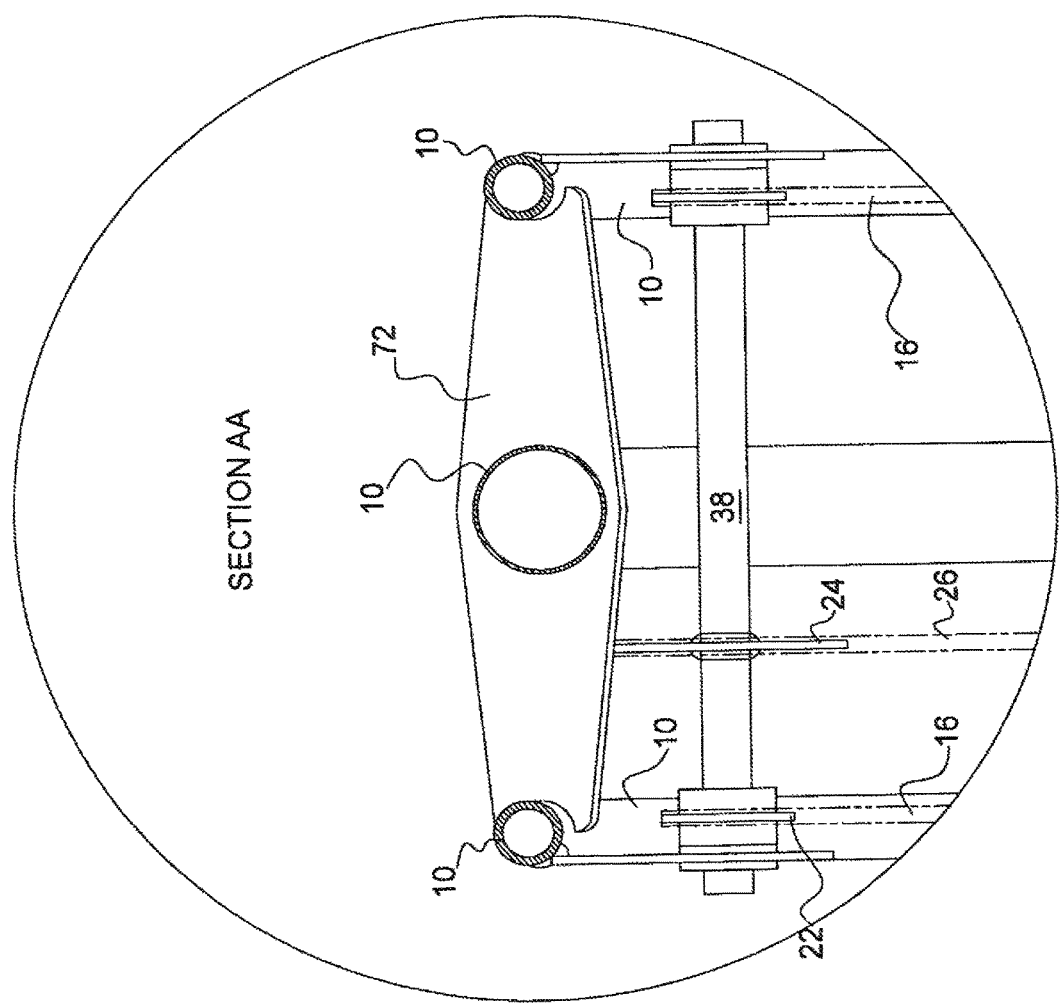

The frame 10 would be made up of primarily high strength aluminum. Below the bore where the spring is attached to the frame of the bicycle is the fulcrum 40 of the lever machines 12. The fulcrum 40 is in a pump bearing 42 (FIG. 4) which reduces friction of the shaft 40 at this pivotal point. The pump bearing 42 would be lined with an aluminum cylinder about the same width of the pump bearing. This aluminum ring would be welded to the frame plate 44 of the bicycle by the tig welding process where the cylinder meets the plate 44 of the frame 10. Welded at the rear edge of this plate 44 is a vertical tube portion of the rear frame and below this tube is the axle 82 (FIG. 2) of the rear wheel 50. The bore that accommodates said axle 82 is offset inwardly towards the center of the bicycle to accommodate conventional size sprocket and hub assemblies. The axle 82 is secured to the frame within a groove in the aluminum plate vertically positioned perpendicularly to a horizontal tube 78 (FIG. 2) by tig welding means. The vertical plate 76 is also welded to a triangular plate 80 that is welded to a vertical symmetrical portion of the frame 10. Two nuts fasten the axle 82 to the frame 10 on both sides of the frame 10.

The drive sprockets 22 is suspended between two vertical triangular plates with a curve surface protruding from its lower edge. The bore accommodating this axle 38 is on center of this protruding curve. In this bore is a pump bearing 37 reducing the friction as the axle 38 rotates forwardly. Thus, the sprocket is fastened to axle by J-B Weld™ means, which allows it to turn the axle forwardly while the freestyle sprocket 22 is able to be reversed in rotation or rotate backwards freely while the axle 38 continues to turn in one forward rotation. Both light and left side sprockets 22 have this ability, while the central sprocket 24 (FIG. 6) having a center bore welded to the drive axle 38 through this bore is positioned on the right side of the rear wheel 50 and is able to rotate the rear sprocket 28 by means of a bicycle chain 26 that connects them both.

Operation

The Lever Enhanced Pedaling System with Elevated Crank Sprockets works in the following manner: Once the bicycle is mounted and one would put one foot on the pedal 52 to propel him or her forward. Once the pedal 52 is pressed downward the drive chain 16 embedded within the vertical tube 62 assembly connected midway to the lever machine 12 would be pulled downward. This would cause the sprocket 22 teeth engaged to the links in the roller chain 16 to be rotated forward. As the drive sprocket 22 is rotated forward the axle 38 fixed within its bore is rotated as well. The opposite ends of the axle 38 rotate within a pump bearing 37 fixed within the plate of the frame 10. A compression spring 20 hooked around the opposite end of the drive chain 16, stretches upwardly in a diagonal motion. Meanwhile the steel cable 14 embedded within the pivotal tube 62 assembly from the top opening would be pulled down along with the chain 16. This steel cable 16 suspended from the pulley wheel 32 within the aluminum housing 34 would rotate said pulley wheel 32, along with the downward movement of the steel cable 14. The tube 62 assembly would pivot backwards slightly and the aluminum housing 34 would pivot backwards slightly. The lever machine 12 pivoting on the axle 40 would pivot downward at that point 40. The pedal 52 would pivot along with the rider's foot maintaining an almost horizontal position while the lever 12 is moving.

The central sprocket 24 would rotate forward along with the forward rotation of the drive sprocket 22. The drive roller chain 26 connected to the central sprocket 24 would engage its teeth at the pitch diameter and rotate along with it. The rear wheel sprocket 28 engaged to the other side of the central roller chain 26 would rotate more revolutions per pedal than the bigger central sprocket 24, indirectly connect to it, because the bigger sprocket 24 has a longer circumference than the rear wheel sprocket 28. The rear wheel sprocket 28 connected to the hub 66 (FIG. 2) which is coupled to the rear wheel 50 would rotate the rear wheel 50 in a forward rotation causing the bicycle to move forward, Meanwhile, on the opposite side of the first downward pedal movement, is its adjacent symmetrical assembly. This includes the pedal that moves upwards and all member components. So while first pedal is pressed downward with the foot, the opposite side assembly moves upward. When this happens the lever machine 12 pivots upwards by the pull of the reciprocal steel cable 14 pulling the lever machine 12 that is fixed above the pivotal connection 60 at which the vertical tubular assembly (62, 58, 64 and 60) pivots on. This assembly would pivot slightly forward, while being elevated. Right before reaching its peak elevation the compression spring 18 embedded within the vertical tube 62 would collide with the bottom surface of the aluminum housing 34 and be compressed. This would allow the opposite pedal moving downward upon which a foot is depressing to meet a cushioned stop. So the opposite upward moving assembly accommodating the spring (62, 58, 64, 60, 14 and 18) would absorb the shock of the ending downward pedal of the first pedal movement and then return energy to the foot by pushing it upward. Meanwhile, the opposite side, as it had moved upward, performed a number of mechanical reactions. The steel cable 14 was pulled upward pulling the lever machine 12 connected to it upward. The extension spring 20 was constricted backwards in a diagonal downward movement while pulling its connected member chain 16 back to for future forward engagement. The symmetrical sprocket 22 of said chain 16 is engaged to rotate backward along with the backward moving chain while the axle 38 it is rotating on is moving forward. Thus, both symmetrical sprockets are able to forcibly rotate this axle 38 forward, while freely moving in the opposite direction. Once the pedal 52 connected to the upward moving lever 12 has reached its peak height in movement, then it would repeat the process of mechanized movement stated in the first propulsion assembly.

In conclusion, this particular design is should not be claimed as the ultimate design, but the mechanical principles that allow lever propulsion to be maximized by the use of multiple radial drive members functioning in coordination with a lever propelled bicycle. That means the axle 38 on which the three radial drive members (22 and 24) rotate could be supported with rotational ability below the frame 10, through the frame 10, or above the frame 10. That means the radial drive members 22 used to rotate the central sprocket 24 could be rotated by a chain wrapped around a cylinder 22 like the wrap around technology of the L.E.P.S. (U.S. Pat. No. 8,465,038 B2) or the central sprocket 24 could be a radial drive member designed to be rotated by a carbon fiber belt as well as the rear wheel sprocket 28 or the symmetrical sprockets 22 could be designed to engage a carbon fiber belt instead of a roller chain. Furthermore, the rear wheel sprocket could be a multispeed sprocket with derailleur gears instead of an internal gear hub or it could be a single speed sprocket

I claim:

1. A lever propelled bicycle comprising:
a rear wheel sprocket;
a central crank sprocket configured to drive the rear wheel sprocket via a chain;
right and left side input radial drive members, wherein the input radial drive members are configured to provide a forward driving force to the central crank sprocket when the input drive members receive forward rotation and configured to slip relative to the central crank sprocket when rotated backwards;
an axle connecting the central crank sprocket with the input radial drive members;
a plate positioned at the rear of said bicycle and above a rear wheel axle;
a right member tubular lever machine configured to pivot relative to the plate;
a right reciprocal cable end portion that is suspended by a right pulley wheel having the ability to pull the right tubular lever machine up, while allowing the right tubular lever machine to be pushed down;
a left member tubular lever machine configured to pivot relative to the plate;
a left reciprocal cable end portion that is suspended by a left pulley wheel providing the ability to pull the left tubular lever machine up, while allowing the left tubular lever machine to be pushed down;
a horizontal axle fixed to the frame that allows said right and left pulley wheels to be suspended by the horizontal axle above the surface of their member lever machines;
the right reciprocal cable end portion is secured to the right tubular lever machine above a surface of said right member tubular lever machine;
the left reciprocal cable end portion is secured to the left tubular lever machine above a surface of said left member tubular lever machine.

2. A lever propelled bicycle comprising:
a rear wheel sprocket;
a central crank sprocket configured to drive the rear wheel sprocket via a chain;
right and left side input radial drive members, wherein the input radial drive members are configured to provide a forward driving force to the central crank sprocket when the input drive members receive forward rotation and configured to slip relative to the central crank sprocket when rotated backwards;
an axle connecting the central crank sprocket with the input radial drive members;
a plate positioned at the rear of said bicycle and above a rear wheel axle;
a right member tubular lever machine configured to pivot relative to the plate;
a right reciprocal cable end portion that is suspended by a right pulley wheel having the ability to pull the right tubular lever machine up, while allowing the right tubular lever machine to be pushed down;
a left member tubular lever machine configured to pivot relative to the plate;
a left reciprocal cable end portion that is suspended by a left pulley wheel providing the ability to pull the left tubular lever machine up, while allowing the left tubular lever machine to be pushed down;
a horizontal axle fixed to the frame that allows said right and left pulley wheels to be suspended by the horizontal axle above the surface of their member lever machines;
the right reciprocal cable end portion is secured to the right tubular lever machine above a surface of said right member tubular lever machine;
the left reciprocal cable end portion is secured to the left tubular lever machine above a surface of said left member tubular lever machine;
a right drive means, wherein the frontal end of the right drive means is embedded within a right vertical drive member positioned above a surface of its right tubular lever machine, while the rear end portion of the right drive means is provided with a means to be pulled from a connection to the rear of the frame, towards the rear of the frame, wherein the right drive means is configured to rotate the right member radial drive member;
a left drive means, wherein the frontal end of the left drive means is embedded within a left vertical drive member positioned above a surface of its left tubular lever machine, while the rear end portion of the left drive means is provided with the means to be pulled from a connection to the rear of the frame, towards the rear of the frame, wherein the left drive means is configured to rotate the left member radial drive member.

3. A lever propelled bicycle comprising:
a rear wheel sprocket;
a central crank sprocket configured to drive the rear wheel sprocket via a chain;
right and left side input radial chive members, wherein the input radial drive members are configured to provide a forward driving force to the central crank sprocket when the input drive members receive forward rotation and configured to slip relative to the central crank sprocket when rotated backwards;
an axle connecting the central crank sprocket with the input radial drive members;
a plate positioned at the rear of said bicycle and above a rear wheel axle;

a right member tubular lever machine configured to pivot relative to the plate;

a right reciprocal cable end portion that is suspended by a right pulley wheel having the ability to pull the right tubular lever machine up, while allowing the right tubular lever machine to be pushed down;

a left member tubular lever machine configured to pivot relative to the plate;

a left reciprocal cable end portion that is suspended by a left pulley wheel providing the ability to pull the left tubular lever machine up, while allowing the left tubular lever machine to be pushed down;

a horizontal axle fixed to the frame that allows said right and left pulley wheels to be suspended by the horizontal axle above the surface of their member lever machines;

the right reciprocal cable end portion is secured to the right tubular lever machine above a surface of said right member tubular lever machine;

the left reciprocal cable end portion is secured to the left tubular lever machine above a surface of said left member tubular lever machine;

a right vertical tube member pivotally connected to the right member tubular lever machine, wherein the right reciprocal cable end portion and a propulsion means for pulling and rotating forward the right radial drive member is embedded within the right vertical tube member positioned above a surface of the right tubular lever machine;

a left vertical tube member pivotally connected to the left member tubular lever machine, wherein the left reciprocal cable end portion and a propulsion means for pulling and rotating forward the left radial drive member is embedded within the left vertical tube member positioned above a surface of the left tubular lever machine.

* * * * *